1

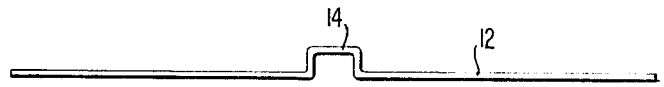
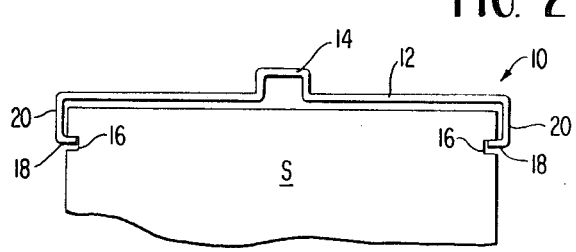
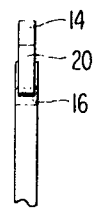
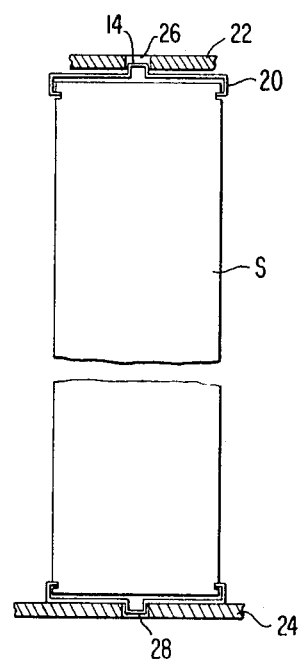
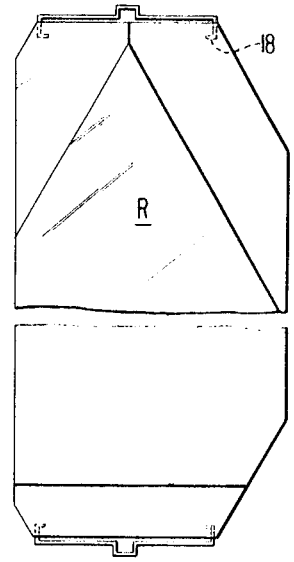
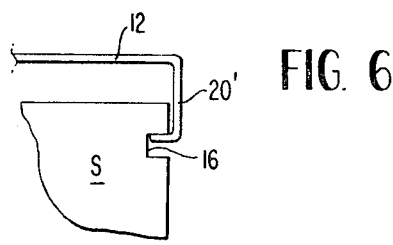
INVENTORS
DAVID WAYNE GEHRES
PAUL L. NEGLEY United States Patent Office
3,623,847
Patented Nov. 30, 1971

3,623,847
SEED HOLDER FOR USE IN HYDROTHERMAL SYNTHESIS OF QUARTZ
David W. Gehres and Paul L. Negley, Carlisle, Pa., assignors to Aiken Industries, Inc., c/o P. R. Hoffman Company, Division of Aiken Industries, Inc., Carlisle, Pa.
Filed Oct. 26, 1967, Ser. No. 678,442
Int. Cl. B01j *17/04;* C01b *33/32*
U.S. Cl. 23—301                          3 Claims

ABSTRACT OF THE DISCLOSURE

Quartz is grown by hydrothermal synthesis in a vertical autoclave on a number of separate seed plates which may be of unequal length but which are held in seed racks having equally spaced tiers. The ends of each seed plate are provided with bent wire holders engaging slots in the sides of the seed plates and extending outwardly from the ends of the seed a variable distance so that each seed and holder assembly of a single tier is the same length to be accommodated in the equally spaced tier. The central portion of each wire holder is bent to form an outwardly extending projection to engage recesses in the tier plates of the seed rack. After rocks are grown on the seeds plates the seeds may be recovered by slicing the grown rock. Thus, the seed and holder assembly can be used over and over.

BACKGROUND

Field of invention

This invention relates to improvement in the hydrothermal synthesis of quartz on seeds, and especially to improvements in holding the seeds.

Prior art

Hydrothermal synthesis of quartz is well known and is usually commercially practiced in vertical autoclaves in which a nutrient is placed in the bottom portion of the autoclave, the autoclave partially filled with an aqueous solution, and seeds are held in the top portion of the autoclave. The autoclave is then heated to provide a high temperature and pressure conducive to the hydrothermal synthesis for growing synthetic quartz on the seeds. These seeds, which are commonly plate shaped, are held by their ends between equally spaced tiers of a seed rack. Due to the length of time required to grow a suitable size quartz rock and the expense of the autoclaves, it is desirable to have as many seeds as possible in one autoclave. Thus, a large number of seeds will be in each one of the tiers of the seed rack, and the seeds will be spaced apart a sufficient distance so that the rocks growing on the seeds will not grow into each other.

There are several known arrangements for holding seeds in seed racks. In one known arrangement, the ends of the seed are formed by cutting or grinding the seed to either form a notch or a tip on it to engage a tier plate in the seed rack. This arrangement has the disadvantage of shortening the length of the seed an amount equal to the formed portion. Since it is desirable to have as long a seed as possible to grow a rock suitable for fabricating into blanks, the shortening of the seed during each growth cycle is a distinct disadvantage. It is also known to provide sheet metal clips bendable over the ends, faces and sides of the seeds and also bendable over a portion of the tier supports in the seed rack. This arrangement, while it doesn't destroy any portion of the seed, has a disadvantage in that each seed of the equally spaced tiers of the seed rack must be the same size and hence the longer seeds must be cut off to the length of the shorter seeds if seeds of a different length are to be used between equally spaced tier supports. Also, some growth is restricted by the holder.

SUMMARY OF THE INVENTION

This invention provides a seed holding arrangement used in the hydrothermal synthesis of quartz which has neither the disadvantage of shortening the seeds for holding purposes or shortening the seeds so that all seeds will be the same length. The seed holder also does not restrict growth on the seed. With the seed holding arrangement of this invention, seeds of different lengths can be utilized between equally spaced tier supports in a seed rack. The seed holder of this invention is attached to each end of a plate-like seed and is formed of a metallic wire no wider than the seed. The wire has a central projection formed therein and hook shaped ends engaging slots in the sides of the seeds. Adjacent the hook shaped ends are vertical spacing portions of the metallic wire which may be of different lengths so that seeds of different lengths may be utilized, with the holder applied thereto, between equally spaced tier supports of a seed rack. After growing a rock on the seed by hydrothermal synthesis, the entire seed plate and holder assembly can be reused again and again in effect making a permanent seed and holder of a defined length which need not be reworked in order to be placed back in the same tier of the seed rack for another growing operation.

BRIEF DESCRIPTION OF THE DRAWINGS

The invention will be described in connection with the accompanying drawing in which:

FIG. 1 is a side elevation view of a metal wire in the first stage of fabrication into a seed holder of this invention.

FIG. 2 is a fragmentary side elevation view of the end portion of a seed with the metallic clip seed holder applied thereto.

FIG. 3 is an end elevation view of the portion of the seed and metallic clip seed holder of FIG. 2.

FIG. 4 is a side elevation view of the seed and seed holder positioned between tier plates of a seed rack.

FIG. 5 shows the rock grown on the seed and seed holder.

FIG. 6 is a fragmentary portion of side elevation view illustrating the variable vertical spacing afforded by the seed holder clip of this invention.

DESCRIPTION OF PREFERRED EMBODIMENT

A seed S is of a plate type such as generally used in the hydrothermal synthesis of quartz. The seed plate's length extends in a crystallographic Y direction, its width in the crystallographic X direction and its thickness in the crystallographic Z direction. It is well known that during hydrothermal synthesis quartz grows fastest in the crystallographic Z direction, it also grows significantly in the crystallographic +X direction and grows in a minor amount in the crystallographic —X direction, while the growth in the crystallographic Y direction is practically insignificant. Because of this and because it is desirable to have the seed as long in the crystallographic Y direction as possible in order to fabricate blanks therefrom economically, it is desirable not to shorten the length of the seed in the crystallographic Y direction by any holding arrangement.

This invention provides a seed holder clip 10 formed of a metallic wire 12 which is a material suitably inert to the hydrothermal process and which can withstand the temperature involved. Stainless steel has been found to be a suitable material. The wire is no thicker than the seed plate, see FIG. 3.

The metallic wire first has a projection 14 formed in a central part thereof for example by bending the wire in a die to provide the 90° bends as shown in FIG. 1.

The seed S is slotted with shallow slots 16 near each end and extending through the thickness of the plate in the crystallographic Z direction. The metal wire 12 has its ends 18 bent inwardly as shown in FIG. 2 to engage in the slots 16.

Immediately adjacent the ends 18 are spacing portions 20 which extend vertically in the assembled clip and seed holder. These spacing portions allow the horizontal central portion of the metal wire 12 to be any desired distance above the top edge of the seed plate.

FIG. 4 shows seed holders clips 10 at both the top and bottom of the seel plate S. The seed plate is positioned between two tier supports 22 and 24 of a seed rack of conventional construction. The seed rack would have a number of tiers spaced apart in an amount equal to the length of the seeds, i.e. 6 to 8 inches, and while the length of the tiers may be adjustable, the tier supports must be parallel with each other thus all spaces between two tier supports 22 and 24 will be equal. Hence, seeds S of unequal length cannot be held between two tier supports unless the seed holder establishes a variable vertical dimension so that each seed and holder assembly are of the same length in the same tier of the seed rack. This is accomplished in this invention by the spacing portion 20 which can be formed to provide a variable dimension. As in FIG. 6 a short seed could have its length effectively extended by providing a longer spacing portion 20' in the metallic wire when the wire is cut to its desired length.

The projecting portion 14 is generally rectangular as viewed in plan and extends through or into slots or recesses 26 and 28 in the tier supports 22 and 24. Because of the rectangular nature of the projection in the slot, the seed plate will not have a tendency to turn about its vertical axis and hence will not become misoriented or cocked so that the rocks grown on the seeds will not grow into one another.

FIG. 5 illustrates a rock R grown on the seed S when the seed is in an autoclave and used in a known conventional hydrothermal process. After the rock R has grown to the desired size, the seed rack and rocks are removed from the autoclave, the rocks which are removed from the rack are then further processed by first slicing to remove the seed and holder assembly which includes the seed S two metallic clips 10 one on each end. The remainder of the rock is processed into blanks suitable for frequency control applications by known methods while the seed and seed holder assembly may be reused in the same tier of the same seed rack. This in effect creates a permanent seed and seed holder assembly and eliminates substantial labor in loading the seeds into the seed rack and preparing the seeds for loading into a seed rack.

It can be seen that by utilizing the seed holding arrangement of this invention the seeds will never be shortened, variable length seeds can be used in the same tier of the seed rack, significant time and effort is saved by providing in effect a permanent seed and holder assembly, and the seeds are prevented from being misoriented during the growing process by the positive registration.

While the invention has been particularly shown and described with reference to preferred embodiments thereof, it will be understood by those skilled in the art that various changes in form and details may be made therein without departing from the spirit and scope of the invention.

What is claimed is:

1. A method of supporting quartz seed plates during the hydrothermal synthesis of quartz carried out in a vertical autoclave under conditions of high temperature and pressure and wherein the seed plates are supported vertically in tiers in the upper portion of the autoclave between spaced tier supports, with the improvements for handling seed plates of different lengths in a single tier comprising; slotting each seed plate on the side edges thereof adjacent the ends, the depth of the slotting extending in the direction of the crystallographic X axis, attaching a seed holder of rectangular section to each end of each seed with the ends of each holder extending in the slots, the holder extending beyond the ends of the plate in the direction of the crystallographic X axis leaving all areas on the face of the seed plate in the plane of the crystallographic Z axis free from interference by the seed plates providing free Z growth bending at least one seed holder of each seed as required to provide a seed and holder assembly having a total length which is equal for each such assembly of a tier, and assembling the seed and holder arrangement in the tier supports having recesses shaped to cooperate with the seed so that the seed will not rotate or move about.

2. A method as in claim 1 further comprising removing grown rocks from the seed rack after the hydrothermal synthesis and slicing the rock to remove the seed and holder assembly, and reusing the seed and holder assembly in another growth cycle to grow an additional quartz rock on the seed.

3. A method of supporting quartz seed plates in the hydrothermal synthesis of quartz carried out in a vertical autoclave under conditions of high temperature and pressure and wherein the seed plates are supported vertically in tiers in an upper portion of the autoclave between spaced tier supports, with improvements comprising; slotting each seed plate on the side edges adjacent to the ends thereof the depth of the slotting extending in the direction of the crystallographic X axis, attaching a metallic wire seed holder of rectangular section to each end of the seed, the seed holder being no wider than the seed and having its ends extending into the slots on the side edges of the seeds, the seed holder extending over each end of the seed and spaced therefrom in the direction of the crystallographic B axis, leaving all areas of the face of the seed plate in the plane of the crystallographic Z axis free from interference by the seed plates permitting free Z growth, and assembling the seed and holder assembly in the fixed support with a portion of the extending ends of the holder engaging the support so that the seed will not move during the hydrothermal synthesis, growing a rock on the seed by hydrothermal synthesis, removing the grown rock from the seed rack and slicing the rock to remove the seed and holder assembly, and reusing the seed and holder assembly and growing another rock on the seed of the seed and holder assembly by hydrothermal synthesis.

References Cited

UNITED STATES PATENTS

| | | | |
|---|---|---|---|
| 1,285,802 | 11/1918 | Russell | 248—316 X |
| 1,311,628 | 7/1919 | Walsh | 248—313 X |
| 2,785,058 | 3/1957 | Buehler | 23—301 |
| 2,923,605 | 2/1960 | Jaffe et al. | 23—301 |
| 2,923,606 | 2/1960 | Hale et al. | 23—301 |
| 2,994,593 | 8/1961 | Sullivan | 23—301 |
| 3,033,405 | 5/1962 | Adell | 248—313 |
| 3,167,227 | 1/1965 | Walden | 248—309 |
| 3,291,575 | 12/1966 | Sawyer | 23—301 |

NORMAN YUDKOFF, Primary Examiner

R. T. FOSTER, Assistant Examiner

U.S. Cl. X.R.

23—273